(12) United States Patent
Newman

(10) Patent No.: US 6,511,037 B1
(45) Date of Patent: Jan. 28, 2003

(54) ELASTOMERIC MOUNTING (C)

(75) Inventor: Donald James Newman, Leicester (GB)

(73) Assignee: Trelleborg AB (SE)

( * ) Notice: Subject to any disclaimer, the term of this patent is extended or adjusted under 35 U.S.C. 154(b) by 0 days.

(21) Appl. No.: 09/807,942

(22) PCT Filed: Oct. 20, 1999

(86) PCT No.: PCT/GB99/03473
§ 371 (c)(1),
(2), (4) Date: Apr. 20, 2001

(87) PCT Pub. No.: WO00/23723
PCT Pub. Date: Apr. 27, 2000

(30) Foreign Application Priority Data

Oct. 21, 1998 (GB) ............................................... 9822917

(51) Int. Cl.[7] ............................................... F16M 13/00
(52) U.S. Cl. ........................ 248/609; 248/677; 248/581; 248/188.8; 267/140.3; 267/141.4
(58) Field of Search ................................ 248/609, 581, 248/589, 188.8, 188.2, 677; 267/140.3, 140.4, 152, 141.4

(56) References Cited

U.S. PATENT DOCUMENTS

| 1,783,801 A | 12/1930 | Liepert |
| 2,674,449 A | 4/1954 | Tucker |
| 3,020,856 A | 2/1962 | Hirst |

FOREIGN PATENT DOCUMENTS

| DE | 584924 | 9/1933 |
| DE | 1682368 | 5/1954 |
| EP | 0263388 | 4/1988 |
| GB | 974210 | 11/1964 |
| GB | 1124790 | 8/1968 |

*Primary Examiner*—Kimberly T. Wood
(74) *Attorney, Agent, or Firm*—Burns, Doane, Swecker & Mathis, L.L.P.

(57) ABSTRACT

An elastomeric mounting (10) suitable for use in the suspension of an off-road vehicle comprises two rigid end members (11, 12) maintained spaced apart by an intervening tubular body (13) of elastomeric material which defines a central chamber (26), and a substantially inextensible connecting means (36) arranged to extend through said central chamber to interconnect said end members and resist more than a predetermined separation of the end members, one (12) of the rigid end members having a cavity member (37) associated therewith and which lies within the axial length of the mounting between the end members to define a location cavity, said one (12) of the rigid end members having a substantially planar axially outwardly facing contact surface (51), a location member (38) positionable in said location cavity captively to engage an end region of the inextensible connecting means (36) and transmit force to the cavity member (37) when the connection means is loaded in tension, said contact surface (51) of an end member being adapted in use to be secured to one (52) of two members (52, 53) to be interconnected by the mounting (10) and said one (52) of two members serving to provide an abutment surface (54) which prevents the location member (37) displacing to a position at which it ceases to captively engage an end region of the inextensible connecting means.

11 Claims, 4 Drawing Sheets

ELASTOMERIC MOUNTING (C)

This invention relates to an elastomeric mounting and in particular, although not exclusively, to a mounting intended normally to be loaded in compression and to resist subjecting the elastomeric material to tensile loading.

The invention relates additionally, but not exclusively, to an elastomeric mounting suitable for use in a vehicle suspension such as the suspension of an off-road truck to transmit compression and tensile forces between two relatively movable components, especially between an axle and the end of a bogie pivot beam.

One example of an elastomeric element normally loaded in compression and resistant to tensile loading of the elastomeric material is that described in the specification of U.S. Pat. No. 4,615,513. That comprises an elastomeric body located between and bonded to rigid end plates. The elastomeric body incorporates a plurality of parallel, spaced, flat metal rings to prevent circumferential outwards bulging of the elastomeric body when the end plates are pressed together. The end plates are also held together by means of a mechanical connecting means in the form of holders which extend into the rubber body from the central portion of the respective end plates, and secondly a link element linked to the holders.

In this construction the mechanical connecting means should provide a limitation to the maximum expansion of the elastomeric body, so as to prevent that body being subjected to tensile loading and a risk of tearing. In practice, when subjected to heavy duty use and the high shock loads experienced in use as part of the suspension of an off-road truck, it is found that the chain links and holders can deform and that the elastomeric material becomes torn.

One object of the present invention, but not the exclusive object, is to provide an improved elastomeric mounting in which there is a better ability to withstand shock tensile loading and/or resist subjecting the elastomeric material to tensile load.

In accordance with one aspect of the present invention an elastomeric mounting comprises two rigid end members maintained spaced apart by an intervening tubular body of elastomeric material which defines a central chamber, and a substantially inextensible connecting means arranged to extend through said central chamber to interconnect said end members and resist more than a predetermined separation of the end members, one of the rigid end members having a cavity member associated therewith and which lies within the axial length of the mounting between the end members to define a location cavity, said one of the rigid end members having a substantially planar axially outwardly facing contact surface, a location member positionable in said location cavity captively to engage an end region of the inextensible connecting means and transmit force to the cavity member when the connection means is loaded in tension, said contact surface of an end member being adapted in use to be secured to one of two members to be interconnected by the mounting and said one of two members serving to provide an abutment surface which prevents the location member displacing to a position at which it ceases to captively engage an end region of the inextensible connecting means.

The cavity member may be provided by a formation which is integral or otherwise directly associated with said one of the rigid end members. Alternatively it may be defined by a part of buffer means associated with said one of the rigid end members and arranged to act in series with the connecting means for the transmission of tensile load. The buffer means may be of a kind which incorporates any one or more of the features described in our co-pending UK patent application of even date and entitled "Elastomeric Mounting (B)".

The location member may, for example, be comprised by a chain half link, and may captively engage a chain link which provides at least a part of said substantially inextensible connecting means.

An elastomeric mounting the subject of the present invention may incorporate one or more other features such as are described in detail below, and also one or more of the features as disclosed more generally in any one or more of our co-pending UK patent applications of even date and entitled "Elastomeric Mounting (A)", "Elastomeric Mounting (B)" and "Elastomeric Mounting (D)".

One embodiment of the present invention is now described by way of example with reference to the accompanying Drawings, in which.

Figure 1:
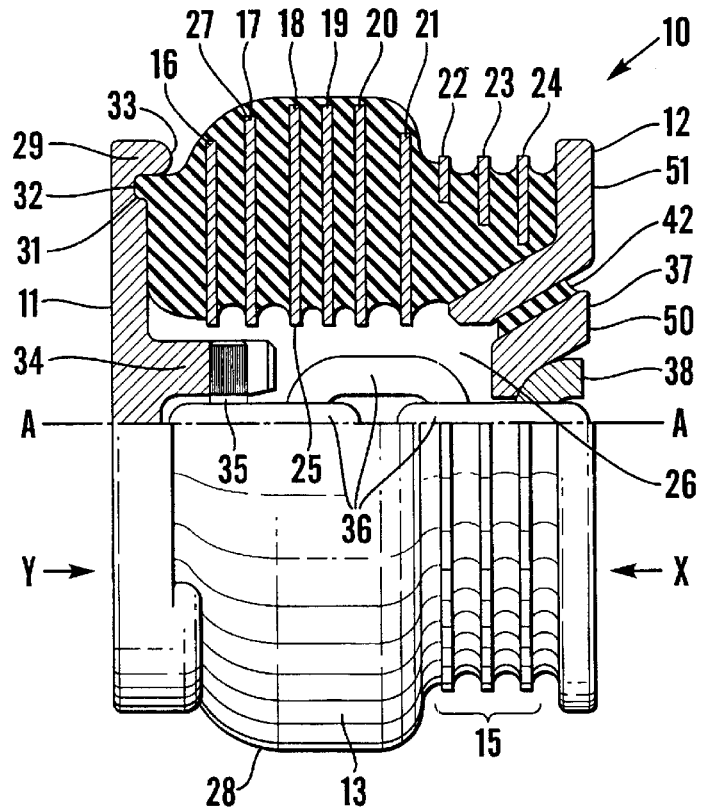
FIG. 1 is a longitudinal cross-section of an elastomeric mounting of the present invention.
Figure 2:
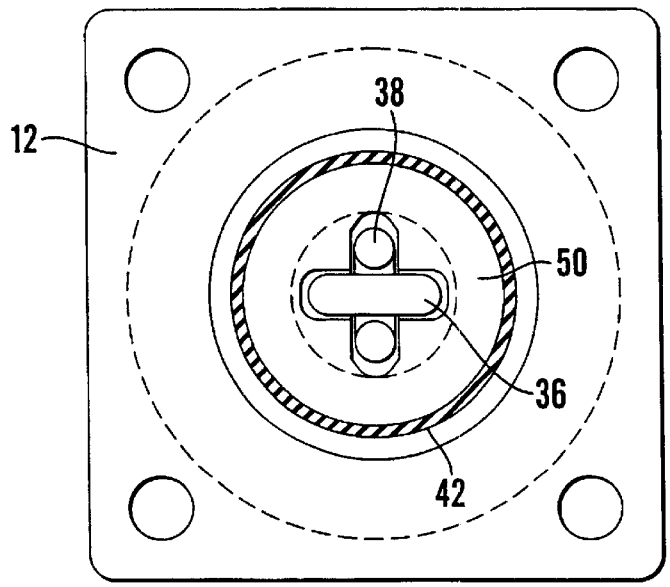
FIG. 2 is an end view of the mounting of FIG. 1 in the direction of arrow "X" of FIG. 1.
Figure 3:
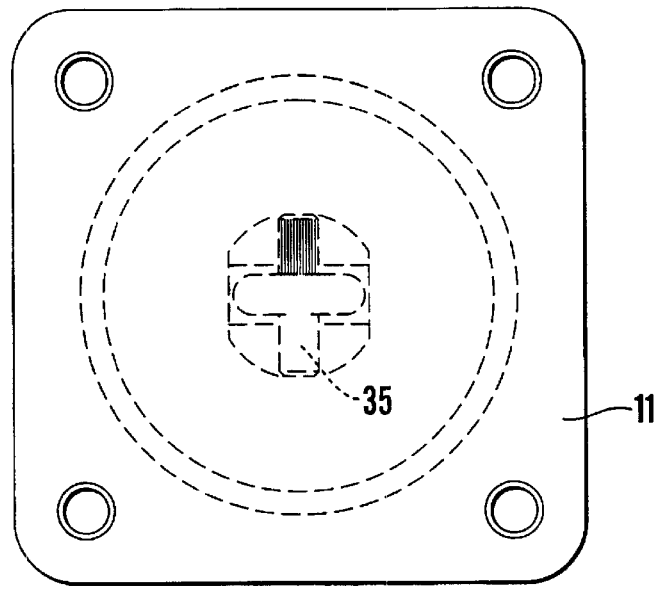
FIG. 3 is an end view of the mounting of FIG. 1 in the direction of arrow "Y" of FIG. 1.
Figure 4:
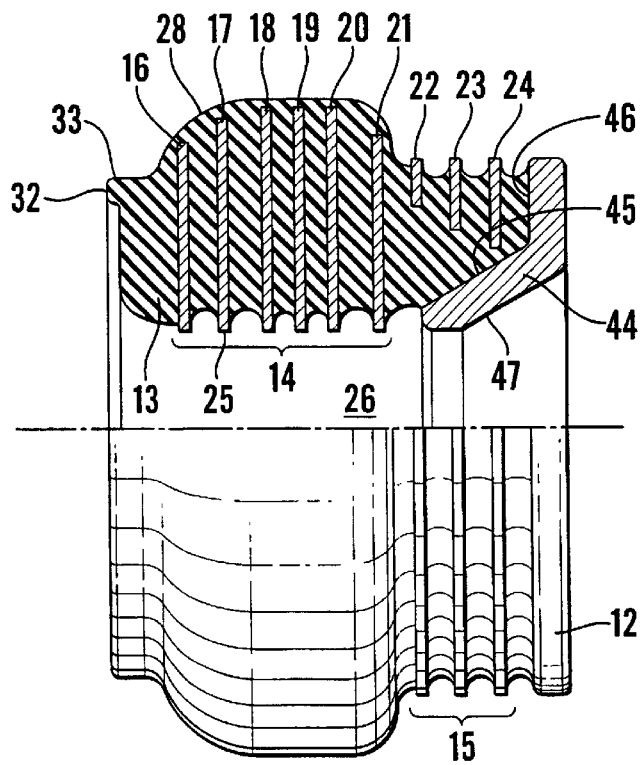
FIG. 4 is a longitudinal cross-section of an main body part of the mounting of FIG. 1.
Figure 5:
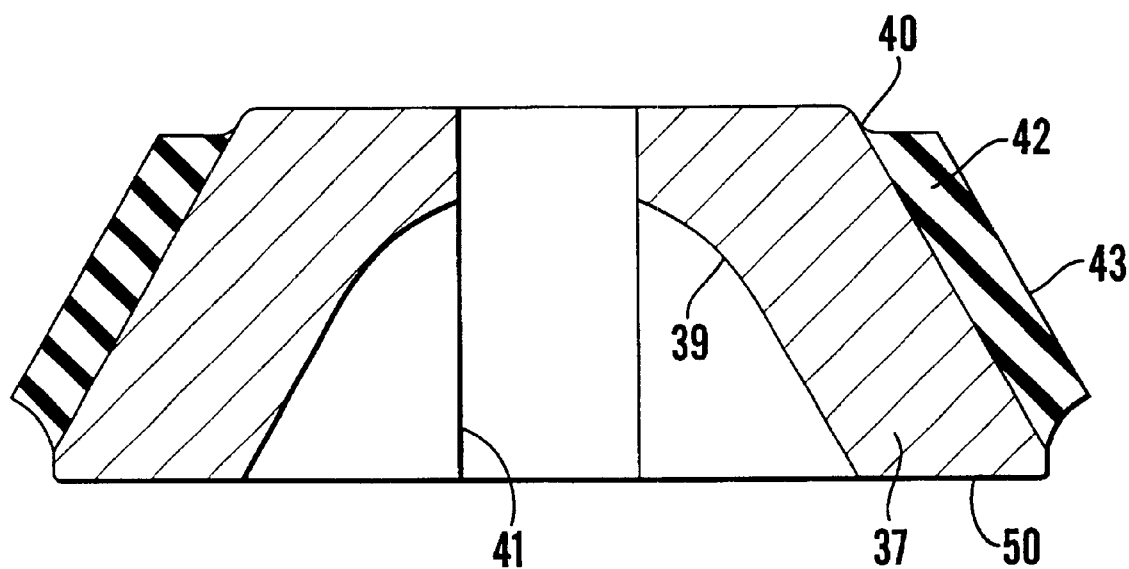
FIG. 5 is a longitudinal cross-section of a buffer body part of the mounting of FIG. 1.
Figure 6:
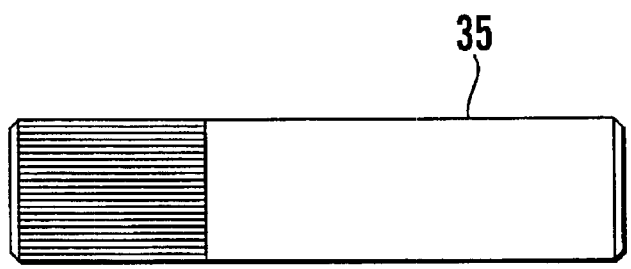
FIG. 6 is a side view of a retention pin.

An elastomeric mounting 10 for positioning between a vehicle axle structure and one end portion of a bogie pivot beam pivotally mounted in a vehicle frame is shown in FIG. 1 to 6.

The mounting 10 comprises two metal end plates 11,12, each of a square shape, and an interposed elastomeric body 13 which is subject to compression loading as the end plates move one toward the other. The body 13 is of a generally tubular form and has an annular cross-sectional shape.

The body 13 is reinforced by two groups 14,15 of metal reinforcing rings 16–24 which are embedded in and bonded to the elastomeric material, in this case natural rubber, of the body.

Each reinforcing ring 16–24 is a flat annular steel disc and is positioned in a plane transverse to the longitudinal axis A—A of the mounting.

In the first group 14 six rings 16–21 are provided, axially spaced apart, and each extends radially for a distance substantially equal to the local radial extent of the elastomeric body at that axial position. The inner edge 25 of each ring 16–21 is exposed to a central chamber 26 defined by the tubular body 13. The outer edge 27 of each of these rings lies just beneath the outer surface 28 of the elastomeric body. The body has a generally smooth profile at that region and conceals the presence of the embedded rings.

The rings 16–21 have a common inner diameter 25. Three of those rings 18–20 also have a common outer diameter. A fourth ring 21 between that set 18–20 of identical rings and the rings 22–24 of the second group 15 has a smaller outer diameter intermediate the outer diameters of the neighboring rings 20,22. At the other end of the set 18–20 the ring 17 has an outer diameter intermediate that of the rings 20 and 21. The end ring 16, nearest the end plate 11 has an outer diameter substantially equal to that of the ring 21, and also substantially equal to the outer diameter of a profiled annular shoulder 29 defined by the end plate 11.

The rings 22 to 24 of the second group 15 have a common outer diameter 30 which is less than the outer diameter of any of the rings of the first group 14. The ring 22 closest to the first group has the largest inner diameter of the second group, the end ring 24 has the smallest inner diameter, and the intermediate ring 23 has an inner diameter intermediate that of the neighboring rings 22,24. The ring 24, which has the smallest inner diameter of the second group, is of an inner diameter greater than that of any of the rings of the first group.

The rings 22–24 of the second group have their outer edges exposed at the outer surface 28 of the elastomeric body, or if covered by a thin protective elastomeric layer nevertheless still have an identifiable presence. At their inner edges the rings 22–24 lie well space from the locally radially inner surface of the elastomeric material.

Successive rings in the second group are uniformly axially spaced apart in the direction A—A, but the rings 16–21 of the first group are non-uniformly spaced. In the first group the rings 18–20 of maximum outer diameter are the most closely spaced. The spacing of the neighboring end rings 21,22 of the two groups 14,15 equals the spacing of the rings of the second group 15.

The elastomeric body is bonded to the end plate 12, but is located relative to the other end plate 11 only by shape features. Adjacent the aforedescribed annular shoulder 29 the end plate 11 has an annular recess 31. The body 13 has an annular end rib 32 which seats in the recess 31, with the radially outer edge 33 of the rib abutting the inner face of the shoulder 29. The shoulder 29 has a smooth, curved top region 33 to provide an abutment surface for the outer surface 28 of the body 13 when under axial compression.

End plate 11 has an integral support sleeve 34 the outer diameter of which is slightly less than the inner diameter of the rings 16–21 of the first group 14. It extends axially beyond at least the first two rings and is intended to cooperate with the rings to ensure, in conjunction with the should 29 and recess 31, that the unbonded end of the body 13 is retained transversely aligned even when the mounting is loaded in tension and the end face of the body can lift away from the plate 11.

The support sleeve 34 provides location for a retention pin 35 that captures an end link of three chain links 36 extending axially in the chamber 26.

The other end of the chain is secured to a buffer member 37 by a half link 38.

Buffer member 37 is of a frusto-conical shape at each of its radially inwardly and outwardly facing surfaces 39,40. The inner surface 39 is provided with a shallow groove 41 to locate the half link 38 and restrain any tendency for the chain to twist between its ends, when the end plates are similarly restrained.

Outer face 40 has a buffer layer 42 of elastomeric material bonded thereto.

The end plate 12 has a frusto-conical portion 44 and the outer surface 43 of the buffer layer 42 is arranged in the assembly to be supported by the radially inwardly facing surface 47 of that portion.

The outwardly facing surface 45 of portion 44 has the elastomeric body 13 bonded thereto. Similarly, body 13 is bonded to a planar outer surface zone 46 of the plate 12.

The angle of the surface 45 relative to axis A—A is equal to, and opposite, the angle of a notional line connecting the inner diameter edges of the three rings 22–24 of the second group 15. The axially inner extremity of the plate portion 44 lies substantially aligned with the axial position of the ring 22 of the second group 15 lying closest to the first group 14.

To assemble the mounting the pin 35 is fitted to the spigot 34 with an end link of the chain thereby being held captive.

The unbonded end of the body 13 is then presented to the end plate 11 to locate the rib 13 relative to the plate recess 31 and shoulder 29. The chain is extended through the chamber 26, and with the buffer member seated in the end plate 12 against surface 47, the body is compressed sufficiently to allow the end half link 38 to be threaded through the end of the chain. The half link is positioned with its free ends aligned with the plane of the outer end faces 50,51 of the buffer member and plate 12, and the applied compression load is then released. The chain then holds the body 13 under residual compression.

Figure 7:
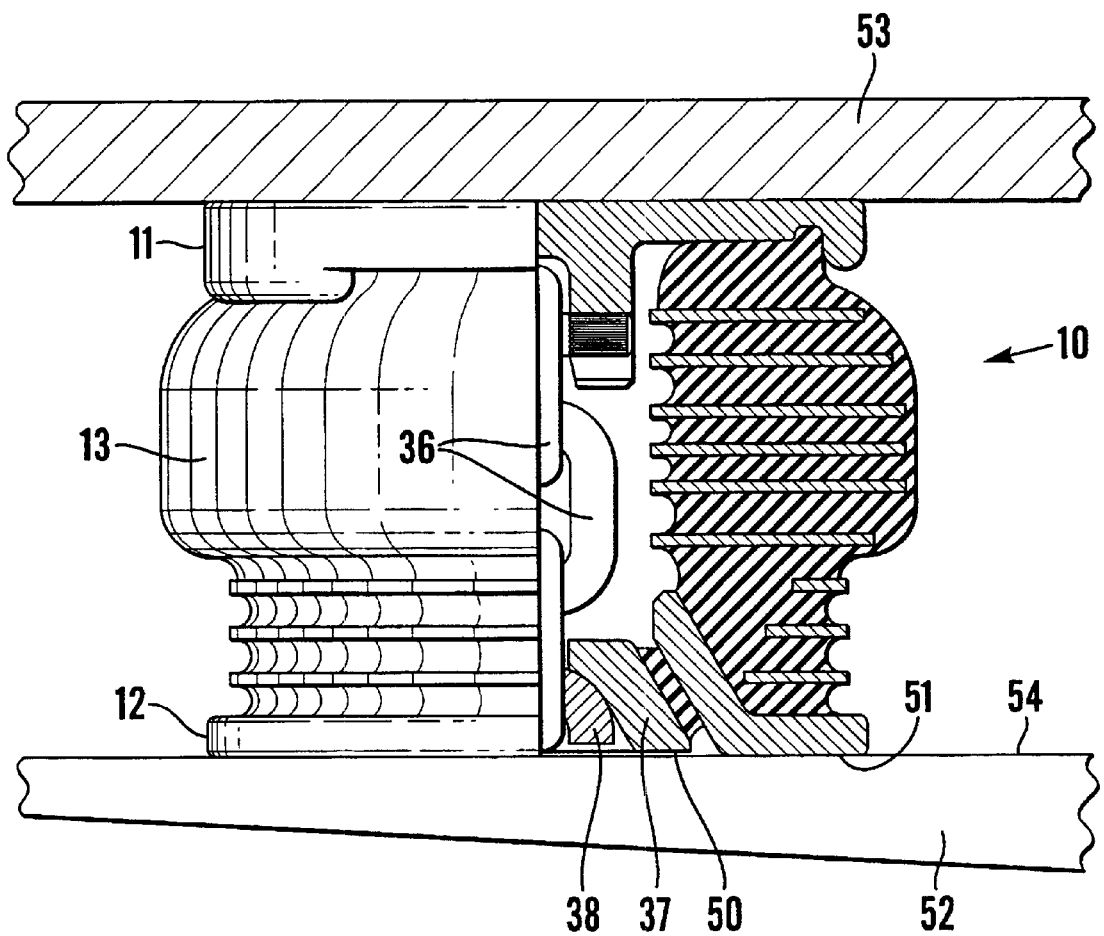
FIG. 7 shows part of a vehicle incorporating the mounting of FIGS. 1–6.

In use of the mounting in a vehicle suspension (see FIG. 7) the faces 50,51 are located against an abutment surface 54 of a vehicle suspension arm 52. That suspension arm thereby locks the half link 38 in position so that it is not free to move and become disengaged from the chain end link. The other end member 11 is secured to a vehicle body part 53.

In normal use, compression loads are withstood by the elastomeric body 13. In the event of applied tensile load, the chain acts resiliently through the buffer member to limit separation of the vehicle members interconnected by the mounting and the unbonded end of the body 13 ensures that the body 13 is protected against tensile load damage.

What is claimed is:

1. An elastomeric mounting comprising two rigid end members maintained spaced apart by an intervening tubular body of elastomeric material which defines a central chamber, characterised in that it comprises a substantially inextensible connecting means arranged to extend through said central chamber to interconnect said end members and resist more than a predetermined separation of the end members, one of the rigid end members having a cavity member associated therewith and arranged to lie within the axial length of the mounting between the end members to define a location cavity, said one of the rigid end members having a substantially planar axially outwardly facing contact surface, a chain half link positionable in said location cavity captively to engage an end region of the inextensible connecting means and transmit force to the cavity member when the connection means is loaded in tension, said cavity member being adapted to prevent or restrain relative rotation between the cavity member and the chain half link and having an inwardly facing frusto-conical surface for engagement by said chain half link, said contact surface of an end member being adapted in use to be secured to one of two members to be interconnected by the mounting and said one of two members serving to provide an abutment surface which prevents the chain half link displacing to a position at which it ceases to captively engage an end region of the inextensible connecting means.

2. An elastomeric mounting according to claim 1, characterised in that the cavity member is provided by a formation which is directly associated with said one of the rigid end members.

3. An elastomeric mounting according to claim 1, characterised in that the cavity member is defined by a part of buffer means with said one of the rigid end members and arranged to act in series with the connecting means for the transmission of tensile load.

4. An elastomeric mounting according to claim 1, characterised in that said half link captively engages a chain link which comprises a least a part of said substantially inextensible connecting means.

5. An elastomeric mounting according to claim 1 characterised in that said one of two members is one of a vehicle body member and a vehicle suspension member.

6. A vehicle suspension characterised in that it comprises a suspension member and an elastomeric mounting according to claim 5, said contact surface of said one of said end members being secured to the suspension member.

7. A vehicle characterised in that it comprises an elastomeric mount according claim 5 positioned between a vehicle body member and a vehicle suspension member.

8. A vehicle according to claim 7, characterised in that the contact surface of an end member is secured to a vehicle body member.

9. A vehicle suspension characterised in that it comprises a suspension member and an elastomeric mounting according to claim 1, said contact surface of said one of said end members being secured to the suspension member.

10. A vehicle characterised in that it comprises an elastomeric mount according claim 1 positioned between a vehicle body member and a vehicle suspension member.

11. A vehicle according to claim 10, characterised in that the contact surface of an end member is secured to a vehicle body member.

* * * * *